United States Patent
Wilkosz et al.

(10) Patent No.: US 11,743,580 B1
(45) Date of Patent: Aug. 29, 2023

(54) METHOD AND SYSTEM FOR CONTROLLING OPERATION OF A FIXED POSITION CAMERA

(71) Applicant: MOTOROLA SOLUTIONS, INC., Chicago, IL (US)

(72) Inventors: Pawel Wilkosz, Wisniowa (PL); Pawel Jurzak, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/663,461

(22) Filed: May 16, 2022

(51) Int. Cl.
  H04N 23/66 (2023.01)
  G06T 7/20 (2017.01)
  G06V 20/52 (2022.01)
  G06V 10/147 (2022.01)
  H04N 23/69 (2023.01)
  H04N 23/695 (2023.01)

(52) U.S. Cl.
  CPC .............. H04N 23/66 (2023.01); G06T 7/20 (2013.01); G06V 10/147 (2022.01); G06V 20/52 (2022.01); G06T 2207/30232 (2013.01); H04N 23/69 (2023.01); H04N 23/695 (2023.01)

(58) Field of Classification Search
  CPC ...... H04N 23/66; H04N 23/69; H04N 23/695; G06T 7/20; G06T 2207/30232; G06V 10/147; G06V 20/52
  See application file for complete search history.

(56) References Cited

U.S. PATENT DOCUMENTS

| | | | |
|---|---|---|---|
| 8,660,849 B2 | 2/2014 | Gruber et al. | |
| 10,540,772 B2 | 1/2020 | Wnuk | |
| 10,839,257 B2 | 11/2020 | Wang et al. | |
| 10,902,267 B2 | 1/2021 | Kucharski et al. | |
| 11,176,366 B2 | 11/2021 | Saptharishi et al. | |
| 11,240,403 B2 | 2/2022 | Marlatt | |
| 11,272,171 B1 * | 3/2022 | Ojha | G06V 20/10 |
| 2009/0232364 A1 | 9/2009 | Hosoi | |
| 2012/0026340 A1 * | 2/2012 | Mikhalkin | G06T 7/248 348/169 |
| 2016/0034767 A1 | 2/2016 | Saptharishi et al. | |
| 2016/0165191 A1 | 6/2016 | Rasheed et al. | |

OTHER PUBLICATIONS

Venetianer et al., "Drone Based Automatic Scene Inventory", MSI Defensive publication—DSC26322, Dec. 29, 2020, all pages.

* cited by examiner

Primary Examiner — Yogesh K Aggarwal (57) ABSTRACT

A method and system for controlling operation of a fixed position camera are disclosed. The method includes determining durations of time with respect to which moving objects are projected to become at least practically out of a capture range of the fixed position camera. Based at least in part on these determined durations of time, a number of changes are made to physical settings of the fixed position camera within respective opportunity windows for achieving respective objectives, and in a priority-ordered manner.

20 Claims, 4 Drawing Sheets

METHOD AND SYSTEM FOR CONTROLLING OPERATION OF A FIXED POSITION CAMERA

BACKGROUND

Video security devices and solutions are becoming more pervasive, especially as they relate to the automated management systems that support those devices and solutions. To improve situational awareness for security response teams and for later investigations, the video footage being captured by the video cameras should be high quality video footage. Nonetheless, merely capturing high resolution video without consideration of whether this is being done in an intelligent or non-intelligent manner may not be sufficient. For example, in some cases keeping setting values of the physical settings for fixed positions cameras constant can result in sub-optimal use of available equipment (such as, for example, capturing a less than desired amount of video data that specifically relates to a number of potential objects of interest that were momentarily within one or more Fields of View (FOVs) of the fixed positions cameras).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer-implemented method for controlling operation of a fixed position camera. The computer-implemented method includes employing the fixed position camera to capture video within which are shown at least a first moving object and a second moving object. The computer-implemented method also includes determining that, at a first time, first setting values of physical settings of the fixed position camera are inadequate to support a plurality of desired video analytics actions to be taken in respect of the first and second moving objects. The computer-implemented method also includes determining a first duration of time with respect to which the first moving object, based on respective movement thereof, is projected to become at least practically out of a capture range for the fixed position camera. The computer-implemented method also includes determining a second duration of time with respect to which the second moving object, based on respective movement thereof, is projected to become at least practically out of the capture range for the fixed position camera. When the second duration of time is less than the first duration of time, at least one processor is employed to command the fixed position camera to: physically change the first setting values to second setting values of the physical settings. The second setting values support execution of at least one first video analytics action of the desired video analytics actions that corresponds to the second moving object. Afterwards, at a second time later than the first time, the second setting values are physically changed to third setting values of the physical settings. The third setting values support execution of at least one second video analytics action of the desired video analytics actions that corresponds to the first moving object.

According to another example embodiment, there is provided a system that includes a fixed position camera configured to capture video within which are shown at least a first moving object and a second moving object. The system also includes at least one storage device configured to store a plurality of setting values of physical settings of the fixed position camera. The system also includes at least one processor communicatively coupled to the fixed position camera. The at least one processor is configured to determine that, at a first time, first setting values of the plurality of setting values are inadequate to support a plurality of desired video analytics actions to be taken in respect of the first and second moving objects. The at least one processor is also configured to determine a first duration of time with respect to which the first moving object, based on respective movement thereof, is projected to become at least practically out of a capture range for the fixed position camera. The at least one processor is also configured to determine a second duration of time with respect to which the second moving object, based on respective movement thereof, is projected to become at least practically out of the capture range for the fixed position camera. When the second duration of time is less than the first duration of time, the fixed position camera is commanded to physically change the first setting values to second setting values of the plurality of setting values. The second setting values support execution of at least one first video analytics action of the desired video analytics actions that corresponds to the second moving object. Afterwards, at a second time later than the first time, the fixed position camera is additionally commanded to physically change the second setting values to third setting values of the plurality of setting values. The third setting values support execution of at least one second video analytics action of the desired video analytics actions that corresponds to the first moving object.

Each of the above-mentioned embodiments will be discussed in more detail below, starting with example system and device architectures of the system in which the embodiments may be practiced, followed by an illustration of processing blocks for achieving an improved technical method, system and computer program product for controlling operation of a fixed position camera. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include humans, vehicles, license plates, animals, etc.

Further advantages and features consistent with this disclosure will be set forth in the following detailed description, with reference to the figures.

Figure 1:
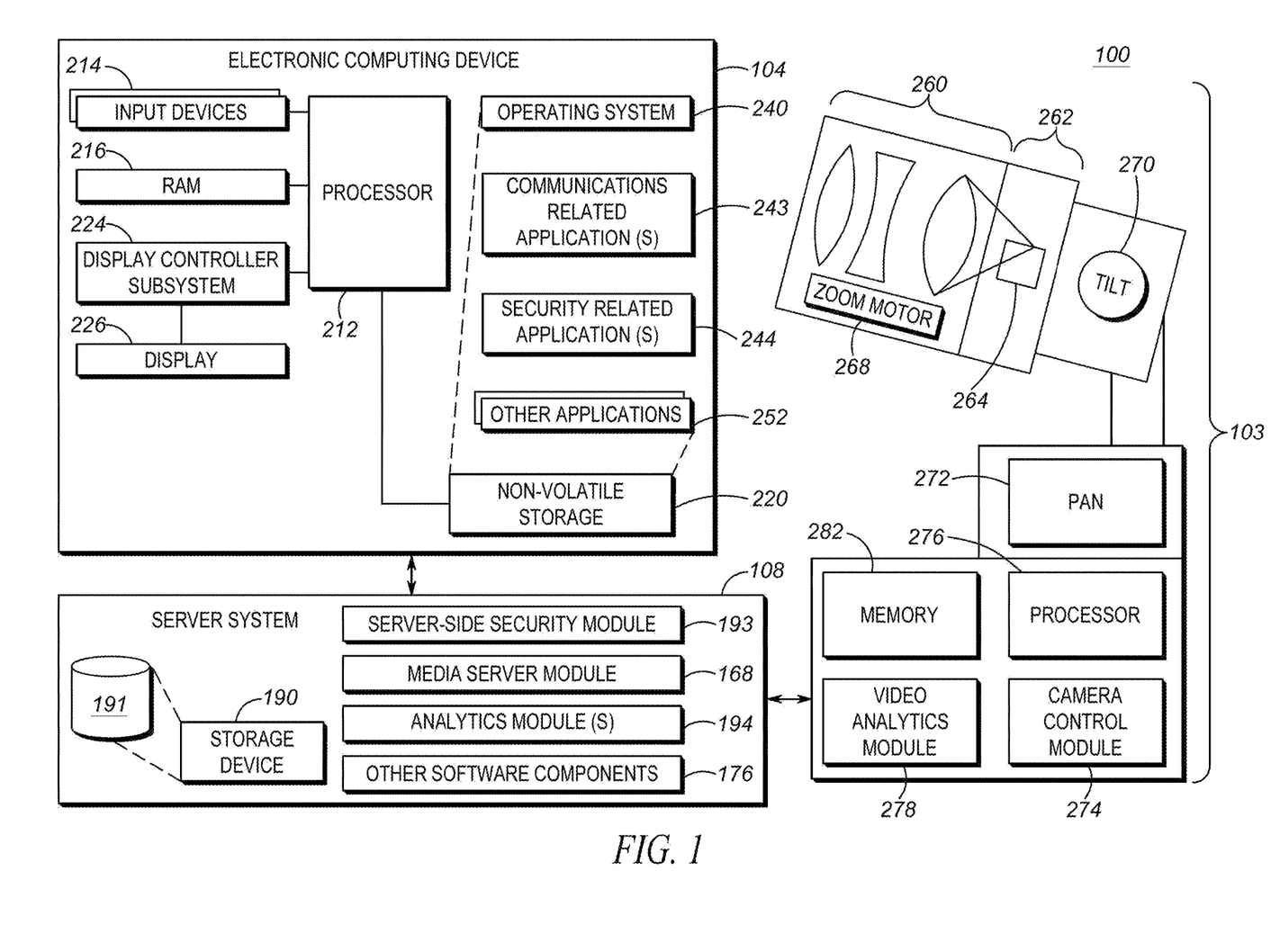
FIG. 1 is a block diagram showing a video system within which methods in accordance with example embodiments can be carried out.

Referring now to the drawings, and in particular FIG. 1 which is a block diagram of a video system 100 within which methods in accordance with example embodiments can be carried out. The video system 100 includes at least one video camera 103 and at least one electronic computing device 104. The video system 100 also includes a server system 108.

In some example embodiments, the electronic computing device 104 is a personal computer system; however in other example embodiments the electronic computing device 104 is a selected one or more of the following: a handheld device such as, for example, a tablet, a phablet, a smart phone or a personal digital assistant (PDA); a laptop computer; a smart television; a two-way radio; and other suitable devices. With respect to the server system 108, this could comprise a single physical machine or multiple physical machines. It will be understood that the server system 108 need not be contained within a single chassis, nor necessarily will there be a single location for the server system 108. In some examples, the server system 108 may be partly or fully implemented within the cloud. As will be appreciated by those skilled in the art, at least some of the functionality of the server system 108 can be implemented within the electronic computing device 104 rather than within the server system 108.

The electronic computing device 104 communicates with the server system 108 through one or more networks that may introduce communication latencies. These networks can include the Internet, or one or more other public/private networks coupled together by network switches or other communication elements. The network(s) could be of the form of, for example, client-server networks, peer-to-peer networks, etc. Data connections between the electronic computing device 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the electronic computing device 104 and the server system 108 are within the same Local Area Network (LAN). In some examples, the electronic computing device 104 communicates directly or indirectly with other parts of video system 100 besides the server system 108. For instance, it is contemplated that the electronic computing device 104 may communicate directly or indirectly with the video camera 103.

Continuing on, the electronic computing device 104 includes at least one processor 212 that controls the overall operation of the electronic computing device 104. The processor 212 interacts with various subsystems such as, for example, input devices 214 (such as a selected one or more of a keyboard, mouse, touch pad, roller ball and voice control means, for example), random access memory (RAM) 216, non-volatile storage 220, display controller subsystem 224 and other subsystems. The display controller subsystem 224 interacts with display 226 and it renders graphics and/or text upon the display 226.

Still with reference to the electronic computing device 104 shown in FIG. 1, operating system 240 and various software applications used by the processor 212 are stored in the non-volatile storage 220. The non-volatile storage 220 is, for example, one or more hard disks, solid state drives, or some other suitable form of computer readable medium that retains recorded information after the electronic computing device 104 is turned off. Regarding the operating system 240, this includes software that manages computer hardware and software resources of the electronic computing device 104 and provides common services for computer programs. Also, those skilled in the art will appreciate that the operating system 240, communications related application(s) 243, security related application(s) 244, and other applications 252, or parts thereof, may be temporarily loaded into a volatile store such as the RAM 216. The processor 212, in addition to its operating system functions, can enable execution of the various software applications on the electronic computing device 104.

Regarding the communications related application(s) 243, these can include any one or more of, for example, an email application, an internet browsing application, an instant messaging application, a talk group application, etc. Additionally, the communications related application(s) 243 may, in some examples, facilitate requests for (and/or receiving of) captured video from the server system 108.

Regarding the security related application(s) 244, this may include, for example, a Video Management Software (VMS) application to enable a user of the electronic computing device 104 to carry out actions related to providing input in relation to images, live video and video recordings (such as, for instance, input to facilitate annotating or selectively exporting, to incident report folders, video footage captured by a plurality of video security video cameras). In some examples, the VMS application can generate commands to change physical settings of the video camera 103, which are then sent to the camera control module 274 of the video camera 103 via server-side security module 193 of the server system 108. In other alternative examples, the generated commands can be transmitted from the electronic computing device 104 to the camera control module 274 of the video camera 103 in a more direct manner (e.g. without involvement of the server system 108). It will be understood that the command generation, command transmission and command response are carried out in a sequential manner, and may introduce latency and, depending on various factors understood by those skilled in the art, this latency may or may not have a consequential impact on operational performance in relation to the video system 100.

In some examples, the security related application(s) 244 may also include other applications including, for instance, a physical security application, an evidence management application, etc.

Still with reference to FIG. 1, the server system 108 includes several software components for carrying out other functions of the server system 108. For example, the server system 108 includes a media server module 168. The media server module 168 handles client requests related to storage and retrieval of video taken by the video camera 103 in the video system 100. In some examples, the media server module 168 may carry out other functions in relation to other forms of media communicated to the electronic computing device 104 from the server system 108. The server system 108 also includes server-side analytics module(s) 194 which can include, in some examples, any suitable one of known commercially available software that carry out computer vision related functions (complementary to any video analytics performed in the video cameras) as understood by a person of skill in the art. The server-side analytics module(s) 194 can also optionally include software for carrying out non-video analytics such as, for example, audio analytics.

The server system 108 also includes a number of other software components 176. These other software components will vary depending on the requirements of the server system 108 within the overall system. As just one example, the other software components 176 might include special test and debugging software, or software to facilitate version updating of modules within the server system 108.

Regarding the at least one storage device 190, this comprises, for example, one or more databases 191 which may facilitate the organized storing of recorded video and other data in accordance with example embodiments. The one or more databases 191 may also contain metadata related to, for example, the recorded video that is storable within one or more storages. The one or more databases 191 may also optionally contain other types of metadata besides video metadata. Examples of metadata other than video metadata, that may be stored in the one or more databases 191, include audio metadata, Global Positioning System (GPS) location metadata, etcetera.

Still with reference to FIG. 1, the video camera 103 is operable to capture a plurality of video frames and produce video data representing the plurality of captured video frames. The video camera 103, a video capturing device, may include, for example, a security video camera (such as, for instance, a pan-tilt-zoom video camera, a dome video camera, an in-ceiling video camera, a box video camera, a bullet video camera, etcetera) or some other type of fixed position camera. In some examples, the video camera 103 may be an analog video camera connected to an encoder. The illustrated video camera 103 may be a 2D video camera; however use of a structured light 3D video camera, a time-of-flight 3D video camera, a 3D Light Detection and Ranging (LiDAR) device, a stereo video camera, or any other suitable type of fixed position camera within the video system 100 is contemplated.

Furthermore, it will also be understood that the video system 100 includes any suitable number of video cameras 103 (i.e. it is merely for convenience of illustration that only one video camera 103 is shown in FIG. 1).

The illustrated video camera 103 includes a lens system 260 capable of zooming in and out and electronics 262 for capturing images. The electronics 262 include an image sensor 264, for capturing a plurality of video frames, as well as other circuitry required by the image sensor. The video camera 103 may be a digital video camera and the image sensor 264 may output captured light as a digital data. For example, the image sensor 264 may be a CMOS, NMOS, or Charge-Couple Device (CCD). The image sensor 264 may be operable to capture light in one or more frequency ranges. For example, the image sensor 264 may be operable to capture light in a range that substantially corresponds to the visible light frequency range. In other examples, the image sensor 264 may be operable to capture light outside the visible light range, such as in the infrared and/or ultraviolet range. In other examples, the video camera 103 may have characteristics such that it may be described as being a "multi-sensor" type of video camera, such that the video camera 103 includes pairs of two or more sensors that are operable to capture light in different and/or same frequency ranges.

The illustrated video camera 103 is able to pan and tilt (for example, by pan and tilt motors, or alternatively pan and tilt positioning of the displayed field of view may be provided in some other way known to the skilled person).

The illustrated lens system 260 includes a number of optical elements that can be repositioned by a zoom and/or focus motor 268. Changing the position of individual optical elements results in a magnification of the image, either zooming in or zooming out. Depending on how it is carried out, zooming for a camera can be either optical zooming or digital zooming.

The illustrated video camera 103 also includes a tilt motor 270 and a pan motor 272. The tilt motor 270 may adjust the positioning of the camera along a first axis, while the pan motor 272 may adjust the positioning of the camera along a second axis, which may be orthogonal to the first axis. For example, the tilt motor 270 may adjust a vertical direction of the camera and the pan motor 272 may adjust a horizontal direction of the camera. Although depicted as pan and tilt motors, it is contemplated that other motors may be used in adjusting the positioning of the camera. Alternatively, the pan and tilting may be done digitally without any motors, by moving a region of interest (ROI) within the sensor space.

It is also contemplated that the panning and tilting may be accomplished using a combination of one or more motors and moving of an ROI.

The illustrated video camera 103 may further include a camera control module 274. The camera control module 274 may be implemented within a processor (including but not limited to the processor 276) or a microcontroller of the video camera 103. The camera control module 274 may process commands transmitted from, for example, the server system 108. This processing of commands may include, for example, asserting and de-asserting control signals provided to motors of the video camera 103 based on the commands being processed by the camera control module 274. In some examples, the camera control module 274 is within the same housing as the video camera 103 (however it is also contemplated that the camera control module 274 may alternatively be provided outside of the housing of the video camera 103).

The video camera 103 includes one or more processors 276, one or more video analytics modules 278, and one or more memory devices 282 coupled to the processors and one or more network interfaces. Regarding the video analytics module 278, this generates metadata outputted to the server system 108. The metadata can include, for example, records which describe various detections of objects such as, for instance, pixel locations for the detected object in respect of a first record and a last record for the video camera within which the respective metadata is being generated.

Regarding the memory device 282 within the video camera 103, this can include a local memory (such as, for example, a random access memory and a cache memory) employed during execution of program instructions. Regarding the processor 276, this executes computer program instructions (such as, for example, an operating system and/or software programs), which can be stored in the memory device 282.

In various embodiments the processor 276 may be implemented by any suitable processing circuit having one or more circuit units, including a digital signal processor (DSP), graphics processing unit (GPU) embedded processor, a visual processing unit or a vision processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the video camera 103, including the processor 276, may be combined together on one semiconductor chip. For example, the processor 276, the memory device 282 and the network interface of the video camera 103 may be implemented within a SOC. Furthermore, when implemented in this way, a general purpose processor and one or more of a GPU or VPU, and a DSP may be implemented together within the SOC.

In various example embodiments, the memory device 282 coupled to the processor 276 is operable to store data and computer program instructions. The memory device 282 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 282 may be operable to store in memory (including store in volatile memory, non-volatile memory, dynamic memory, etc. or any combination thereof). The memory device 282 need not necessarily be a single device, but instead may be comprised of a plurality of separately packaged electronic articles of manufacture inserted into, provided inside, or otherwise provided locally at the video camera 103.

As shown in FIG. 1, the video camera 103 is coupled to the server system 108. In some examples, the video camera 103 is coupled to the server system 108 via one or more suitable networks that may introduce communication latencies. These networks can include the Internet, or one or more other public/private networks coupled together by network switches or other communication elements. The network(s) could be of the form of, for example, client-server networks, peer-to-peer networks, etc. Data connections between the video camera 103 and the server system 108 can be any number of known arrangements, examples of which were previously herein detailed. In at least one example embodiment, the video camera 103 and the server system 108 are within the same Local Area Network (LAN). In some examples, the video camera 103 may be coupled to the server system 108 in a more direct manner than as described above.

Figure 2:
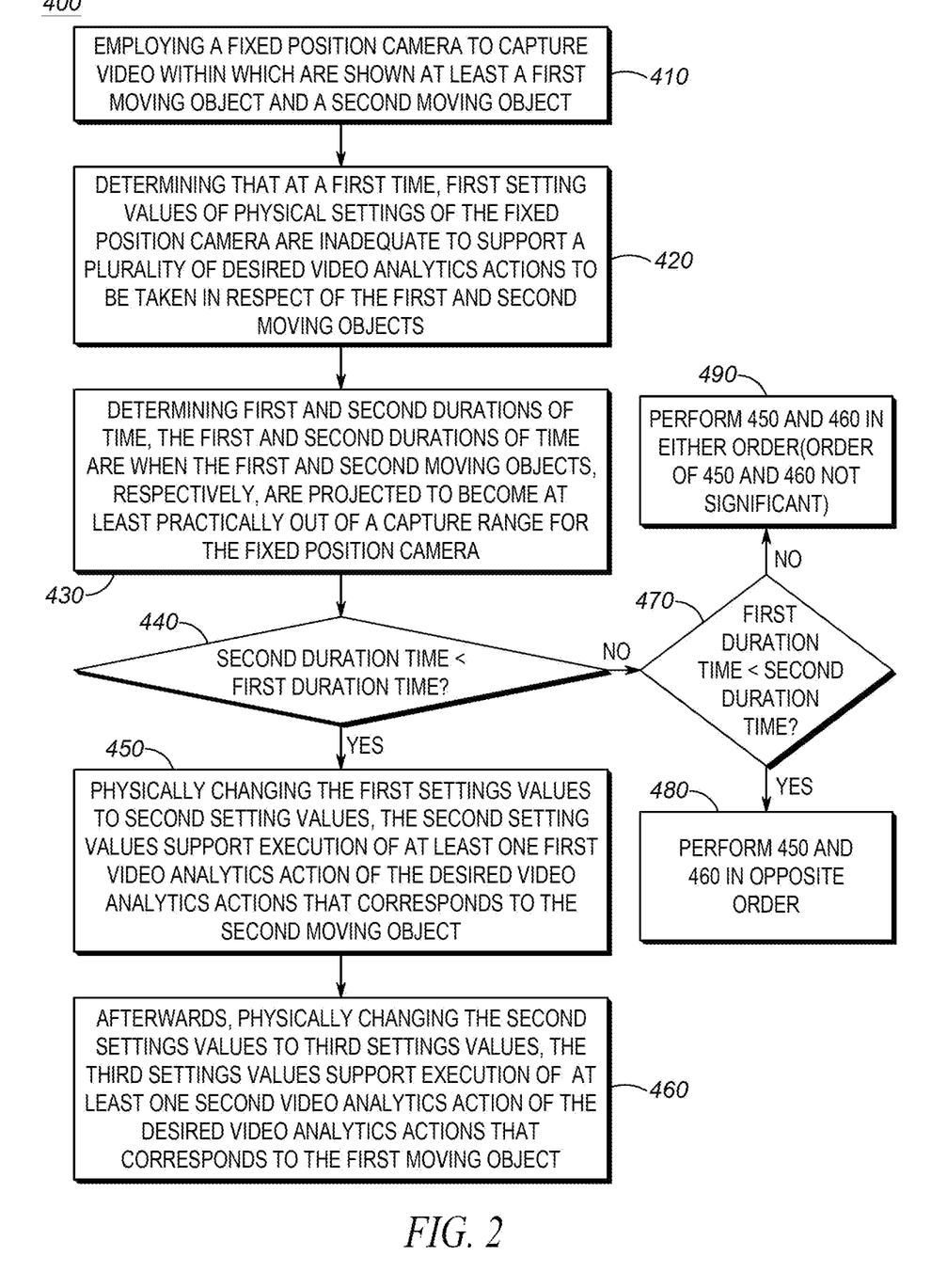
FIG. 2 is a flow chart illustrating a computer-implemented method for controlling operation of a fixed position camera in accordance with an example embodiment.
Figure 3:
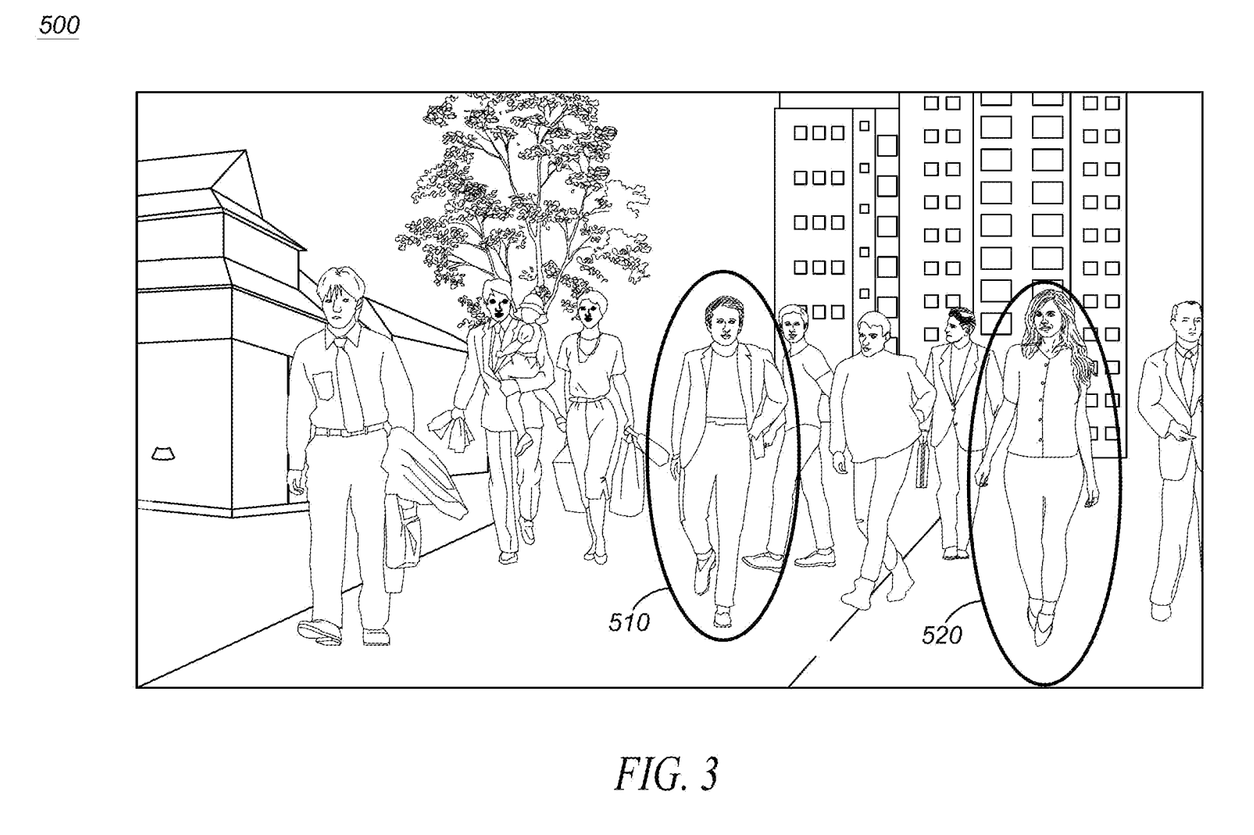
FIG. 3 is a diagram showing an image taken by a fixed position camera in accordance with an example embodiment.
Figure 4:
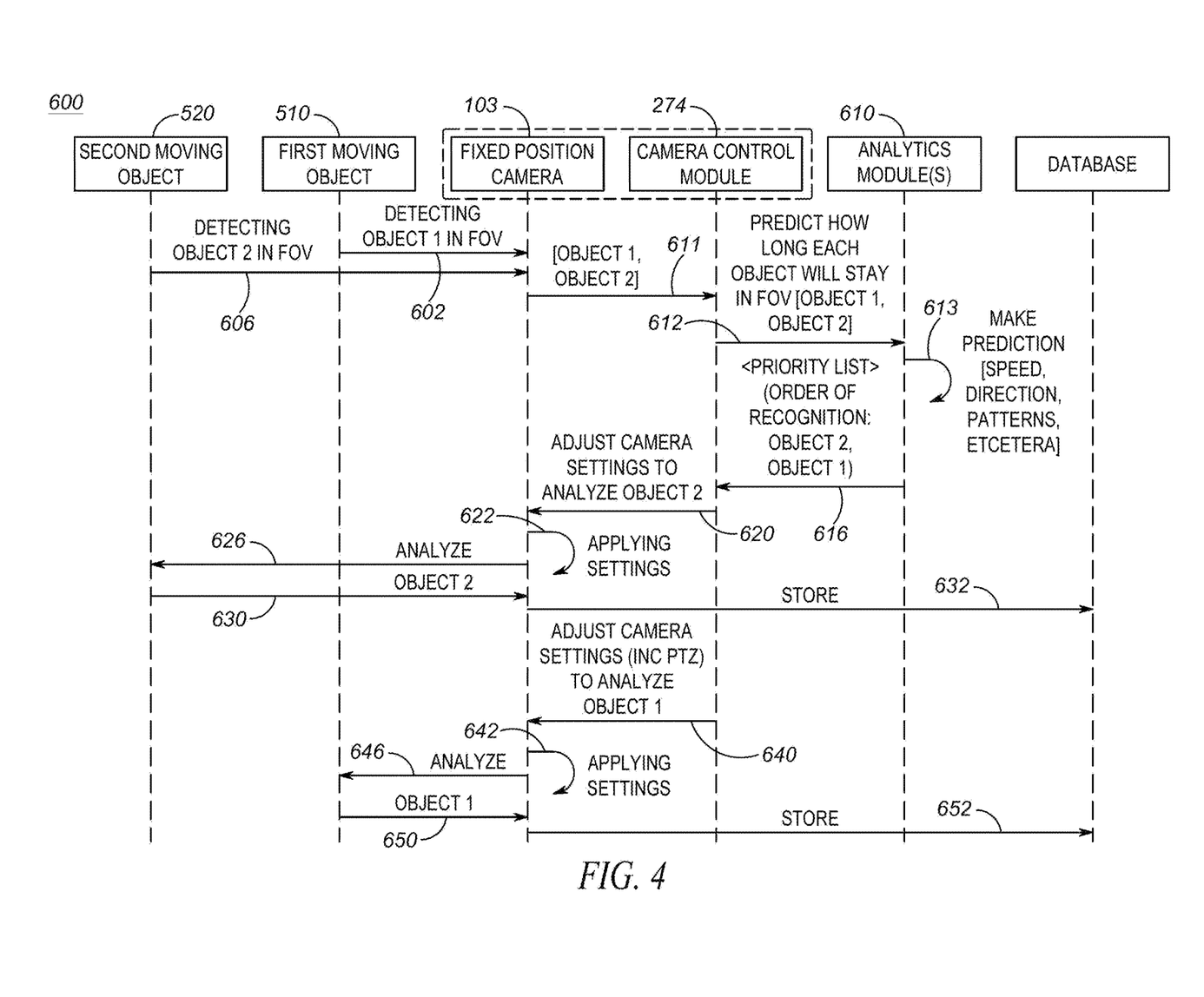
FIG. 4 is a sequence diagram providing additional example technical details that relate the computer-implemented method of FIG. 2.

Reference is now made to FIGS. 2 to 4. Starting with FIG. 2, this is a flow chart illustrating a method 400 for controlling operation of a fixed position camera (such as, for example, the video camera 103 of FIG. 1) in accordance with an example embodiment.

First in the illustrated method 400, the camera (for example, the video camera 103) is employed (410) to capture video within which are shown at least a first moving object and a second moving object. For instance, referring to FIG. 3 (which diagrammatically illustrates an image 500 captured by a fixed position camera) there is shown a first moving object 510 and a second moving object 520 (in FIG. 3 the example moving objects are both people, but other/different types of moving objects such as, for example, a vehicle, a license plate, etcetera are also contemplated). Also, the first and second moving objects 510 and 520 may be initially detected within the video system (for example, object detection may be carried out by the video analytics module 278 or the analytics module 194, the details of which will be understood by the skilled person). With reference to the example sequence diagram 600 of FIG. 4, this is initial detection is diagrammatically illustrated by way of arrows 602 and 606.

Continuing on, the illustrated method 400 of FIG. 2 next includes determining (420) that, at a first time, first setting values of physical settings of the fixed position camera are inadequate to support a plurality of desired video analytics actions to be taken in respect of the first and second moving objects. Examples of the physical settings include a pan setting (for instance, the pan motor 272 of FIG. 1 was earlier herein described), a tilt setting (for instance, the tilt motor 270 of FIG. 1 was earlier herein described), an optical zoom setting (for instance, the zoom and/or focus motor 268 of FIG. 1 was earlier herein described), an focus setting (for instance, the zoom and/or focus motor 268), and a resolution setting. Regarding the desired video analytics actions, these can be any suitable video analytics actions such as, for example, analytics-based identifications of the first and second moving objects 510 and 520.

Continuing on in respect of the illustrated method 400, next is determining (430) first and second durations of time. The first and second durations of time are when the first and second moving objects, respectively, are projected to become at least practically out of a capture range for the fixed position camera. In some examples, limits of the capture range for the fixed position camera may be defined by movement ranges of the fixed position camera and a physical distance between object and camera locations. For instance, one or both of the first and second moving objects 510 and 520 might move from inside to outside one of the top, bottom or side boundaries of a "superset range" defined by all physically attainable FOVs for the video camera 103 (i.e. the video camera 103 in a fixedly installed condition at a given location within a geography of the video system 100). As another example, one or both of the first and second moving objects 510 and 520 might move from being first at a suitable capture distance to, afterwards, a distance away from the video camera 103 that is too great (i.e. beyond a suitable capture distance). Also, those skilled in the art will appreciate that certain actions tangential to the method 400 will be inherently understood, and so are not extensively herein discussed so as to facilitate a more direct understanding of example embodiments. For example, if it is determined that a moving object will move out of a capture range for the fixed position camera too quickly, then that moving object may be taken out of consideration in favor of one or more moving objects where such is not the case. Whether an object will move out of a capture range for the fixed position camera too quickly may be assessed in terms of inability to meet a window of time needed for physical setting(s) to be changed and/or time needed for taking a video analytics action.

In some examples, the first and second durations of time are adjusted durations of time (for instance, adjusted to account for impacting communication latencies discussed previously). In other examples, the first and second durations of time are unadjusted durations of time.

It will be understood that, in some examples, the action 430 includes relevant data being communicated and intelligently processed between the video camera 103, the camera control module 274, and one or more analytics modules 610 (which may comprise, for instance, one or more of the analytics module(s) 194 and the video analytics module 278 shown in FIG. 1). Arrows 611, 612 and 613 in FIG. 4 diagrammatically provide example illustrative details of how such communication and intelligent processing may occur. Also, the action 430 may, in some examples, include calculating average speeds and directions of the first and second moving objects 510 and 520.

Next the illustrated method 400 includes decision action 440. Specifically, it is checked whether, in respect of the previously determined durations of time, the second duration of time is less than the first duration of time (see also communication of "Priority List" from the analytics module(s) 610 to the camera control module 274 shown as arrow 616 in FIG. 4).

Continuing on, if the "YES" branch for the decision action 440 applies, then action 450 follows, and the first setting values are changed to second setting values of the physical settings (i.e. physical settings of the fixed position camera such as, for example, the video camera 103). Regarding the second setting values of the physical settings, these support execution of at least one first video analytics action of the desired video analytics actions that corresponds to the second moving object (for example, the second moving object 520). With reference to the sequence diagram 600, arrows 620, 622, 626, 630 and 632 are associated with some examples of the action 450.

Afterwards (i.e. a later point in time than the action 450) the second settings values of the physical settings are physically changed (460) to third setting values of the physical settings. Regarding the third setting values of the physical settings, these support execution of at least one second video analytics action of the desired video analytics actions that corresponds to the first moving object (for example, the first moving object 510). With reference to the sequence diagram 600, arrows 640, 642, 646, 650 and 652 are associated with some examples of the action 450.

With reference again to the decision action 440, decision action 470 follows from the "NO" branch of the decision action 440. In such case, it is checked whether, in relation to the previously determined durations of time, the first duration of time is less than the second duration of time. If "YES", then action 480 follows, namely the actions 450 and 460 are performed effectively in opposite order (i.e. the first settings values are changed to the third setting values, and then afterwards the third setting values are changed to the second setting values).

With reference again to the decision action 470, action 490 follows in the case of "NO". In such case, the actions 450 and 460 may be performed effectively in any arbitrary order since this case corresponds to the first and second durations of time being equal.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and a human mind cannot capture video to have video analytics actions carried out thereon, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method for controlling operation of a fixed position camera, the computer-implemented method comprising:
   employing the fixed position camera to capture video within which are shown at least a first moving object and a second moving object;
   determining that, at a first time, first setting values of physical settings of the fixed position camera are inadequate to support a plurality of desired video analytics actions to be taken in respect of the first and second moving objects;
   determining a first duration of time with respect to which the first moving object, based on respective movement thereof, is projected to become at least practically out of a capture range for the fixed position camera;
   determining a second duration of time with respect to which the second moving object, based on respective movement thereof, is projected to become at least practically out of the capture range for the fixed position camera; and when the second duration of time is less than the first duration of time, employing at least one processor to command the fixed position camera to:

physically change the first setting values to second setting values of the physical settings, the second setting values supporting execution of at least one first video analytics action of the desired video analytics actions that corresponds to the second moving object, and afterwards, at a second time later than the first time, physically change the second setting values to third setting values of the physical settings, the third setting values supporting execution of at least one second video analytics action of the desired video analytics actions that corresponds to the first moving object.

2. The computer-implemented method as claimed in claim 1 wherein limits of the capture range for the fixed position camera are defined by movement ranges of the fixed position camera and a physical distance between object and camera locations.

3. The computer-implemented method as claimed in claim 1 wherein the physical settings of the fixed position camera include at least two or more of a pan setting, a tilt setting, an optical zoom setting, a focus setting and a resolution setting.

4. The computer-implemented method as claimed in claim 1 wherein the determining of the first and second durations of time include calculating average speeds and directions of the first and second moving objects.

5. The computer-implemented method as claimed in claim 1 wherein each of the first and second moving objects is a selected one of a person, vehicle and a license plate.

6. The computer-implemented method as claimed in claim 1 wherein the first and second durations of time are unadjusted durations of time.

7. The computer-implemented method as claimed in claim 1 wherein the first and second durations of time are adjusted durations of time to account for impacting communication latencies.

8. The computer-implemented method as claimed in claim 7 wherein:

the commanding by the at least one processor is carried out at a location remote from the fixed position camera, and the impacting communication latencies include cloud-related communication latencies.

9. The computer-implemented method as claimed in claim 1 further comprising:

carrying out, at the at least one processor, the first and second video analytics actions to generate video metadata; and storing the video metadata in a database.

10. The computer-implemented method as claimed in claim 1 wherein the desired video analytics actions include analytics-based identifications of at least the first and second moving objects.

11. A system comprising:

a fixed position camera configured to capture video within which are shown at least a first moving object and a second moving object;

at least one storage device configured to store a plurality of setting values of physical settings of the fixed position camera; and at least one processor communicatively coupled to the fixed position camera, the at least one processor configured to:

determine that, at a first time, first setting values of the plurality of setting values are inadequate to support a plurality of desired video analytics actions to be taken in respect of the first and second moving objects;

determine a first duration of time with respect to which the first moving object, based on respective movement thereof, is projected to become at least practically out of a capture range for the fixed position camera;

determining a second duration of time with respect to which the second moving object, based on respective movement thereof, is projected to become at least practically out of the capture range for the fixed position camera; and when the second duration of time is less than the first duration of time, command the fixed position camera to:

physically change the first setting values to second setting values of the plurality of setting values, the second setting values supporting execution of at least one first video analytics action of the desired video analytics actions that corresponds to the second moving object, and afterwards, at a second time later than the first time, physically change the second setting values to third setting values of the plurality of setting values, the third setting values supporting execution of at least one second video analytics action of the desired video analytics actions that corresponds to the first moving object.

12. The system as claimed in claim 11 wherein limits of the capture range for the fixed position camera are defined by movement ranges of the fixed position camera and a physical distance between object and camera locations.

13. The system as claimed in claim 11 wherein the physical settings of the fixed position camera include at least two or more of a pan setting, a tilt setting, an optical zoom setting, a focus setting and a resolution setting.

14. The system as claimed in claim 11 wherein a calculating of average speeds and directions of the first and second moving objects is included when the first and second durations of time are determined.

15. The system as claimed in claim 11 wherein each of the first and second moving objects is a selected one of a person, vehicle and a license plate.

16. The system as claimed in claim 11 wherein the first and second durations of time are unadjusted durations of time.

17. The system as claimed in claim 11 wherein the first and second durations of time are adjusted durations of time to account for impacting communication latencies.

18. The system as claimed in claim 17 wherein:

the at least one processor is located remote from the fixed position camera, and the impacting communication latencies include cloud-related communication latencies.

19. The system as claimed in claim 11 wherein the at least one processor is further configured to:

carry out the first and second video analytics actions to generate video metadata; and store the video metadata in a database residing within the at least one storage device.

20. The system as claimed in claim 11 wherein the desired video analytics actions include analytics-based identifications of at least the first and second moving objects.

* * * * *